United States Patent [19]

Dennison

[11] Patent Number: 4,717,610
[45] Date of Patent: Jan. 5, 1988

[54] COMPOSITE DISK FOR SUPPORTING FAN BLADES

[75] Inventor: William T. Dennison, Vernon, Conn.

[73] Assignee: United Technologies Corporation, Hartford, Conn.

[21] Appl. No.: 10,237

[22] Filed: Feb. 2, 1987

[51] Int. Cl.[4] .......................... B32B 5/02; B32B 5/12
[52] U.S. Cl. .................................... 428/65; 428/105; 428/113; 416/204 A
[58] Field of Search ................ 428/65, 105, 109, 113; 416/204 A, 204 R, 214 A, 214 R, 220 R

[56] References Cited

U.S. PATENT DOCUMENTS 2,802,680  8/1957  McVeigh .................. 416/204 A
3,622,249  11/1971  Hayashi et al. ............... 416/204

*Primary Examiner*—Alexander S. Thomas
*Attorney, Agent, or Firm*—Charles A. Warren

[57] ABSTRACT

A composite support disc for a row of fan blades in a bypass turbine engine in which the ring is made up of plies of high strength fibers so oriented as to carry the loading developed on the ring by the fan and with the fan blades mounted to minimize the loading on the composite disc. The orientation of the fibers are different in selected areas of the disc to provide a high strength disc with a minimum weight.

14 Claims, 6 Drawing Figures

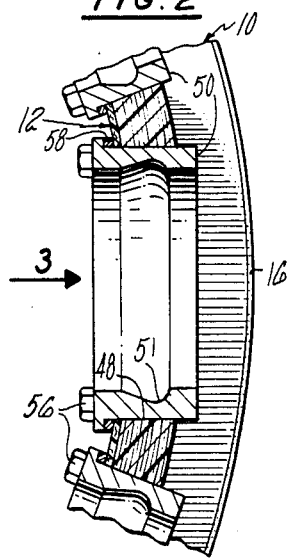
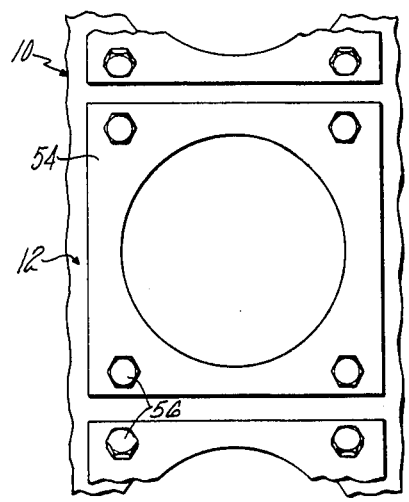
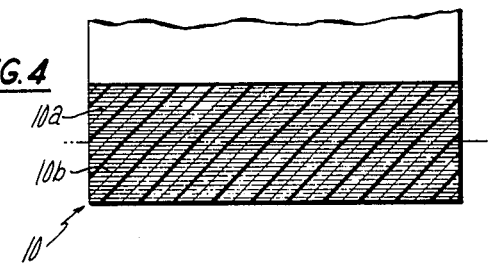
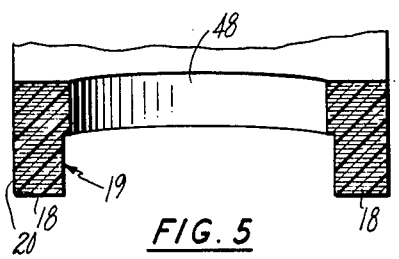
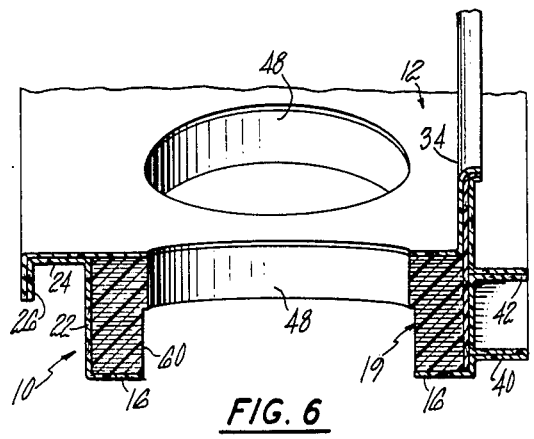

COMPOSITE DISK FOR SUPPORTING FAN BLADES

DESCRIPTION

1. Technical Field

This invention relates to a composite disk or ring for supporting the fan blades on a high bypass turbine engine particularly where the fan is mounted outside and surrounding the engine core.

2. Background Art

These disks or rings have been made generally of a metal which is machined to provide the circumferentially spaced bearing mountings in which the individual fan blade roots are supported for turning movement in adjusting the pitch of the blades. These metallic rings are necessarily heavy in order to carry the loading thereon during the operation of the fan. It is well known that weight reduction is desirable wherever possible in a aircraft engine and if a composite support ring can be made strong enough to carry the loading on the blades a substantial weight reduction will result with an inevitable significant reduction in the total weight of the engine.

DISCLOSURE OF INVENTION

A feature of the invention is a composite ring for supporting the blades, this ring being strong enough to carry the loading on the ring without failing during engine operation. Another feature is a ring with integral composite flanges thereon for attachment of support flanges or driving flanges or as sealing flanges cooperating with fixed sealing elements. These integral composite flanges are a integral part of the composite ring.

Another feature is the positioning of mounting bosses in the composite ring to support the blades in position extending radially outward from the ring and so supported that they can be rotated on their radial axes for pitch changing. Another feature is the provision of these mounting bosses in such a way as to avoid any wear on the composite disk as a result of the motion of the blade roots within the supporting structure.

According to the invention the ring assembly includes a basic ring made up of layers of plies of fibers so oriented as to provide the necessary strength in the several directions so that the ring is capable of carrying all of the loading thereon. This composite ring has radial holes to receive mounting bosses for the individual fan blades, these bosses being flanged at their inner ends and bolted by these flanges to the ring to support the bosses securely in position and to distribute the load from these bosses adequately into the ring structure. The outer surface of the ring has an annular recess that intersects the radial holes and exposes the outer ends of the bosses therein. The ring also has additional plies of composite fibers placed around the ring and made an integral part thereof, these plies being located at both end surfaces and also the inner and outer surfaces of the ring and being bonded together with the ring to form integral flanges or extensions of the ring to provide for attachment of driving mechanisms, and support structures or to serve as sealing flanges.

The foregoing and other objects, fetures and advantages of the present invention will become more apparent from the following description of preferred embodiments and accompanying drawings.

BRIEF DESCRIPTION OF DRAWINGS

FIG. 2 is a transverse sectional view of the portion of the ring.

FIG. 3 is a view looking in the direction of the arrow 3 of FIG. 2 to show the position of the flanges on the support bosses.

FIG. 4 is a sectional view of the ring structure before being machined.

FIG. 5 is a sectional view of the ring after being machined.

FIG. 6 is a sectional view of the ring after the additional plies have been added to the surfaces of the basic ring.

BEST MODE FOR CARRYING OUT THE INVENTION

Figure 1:
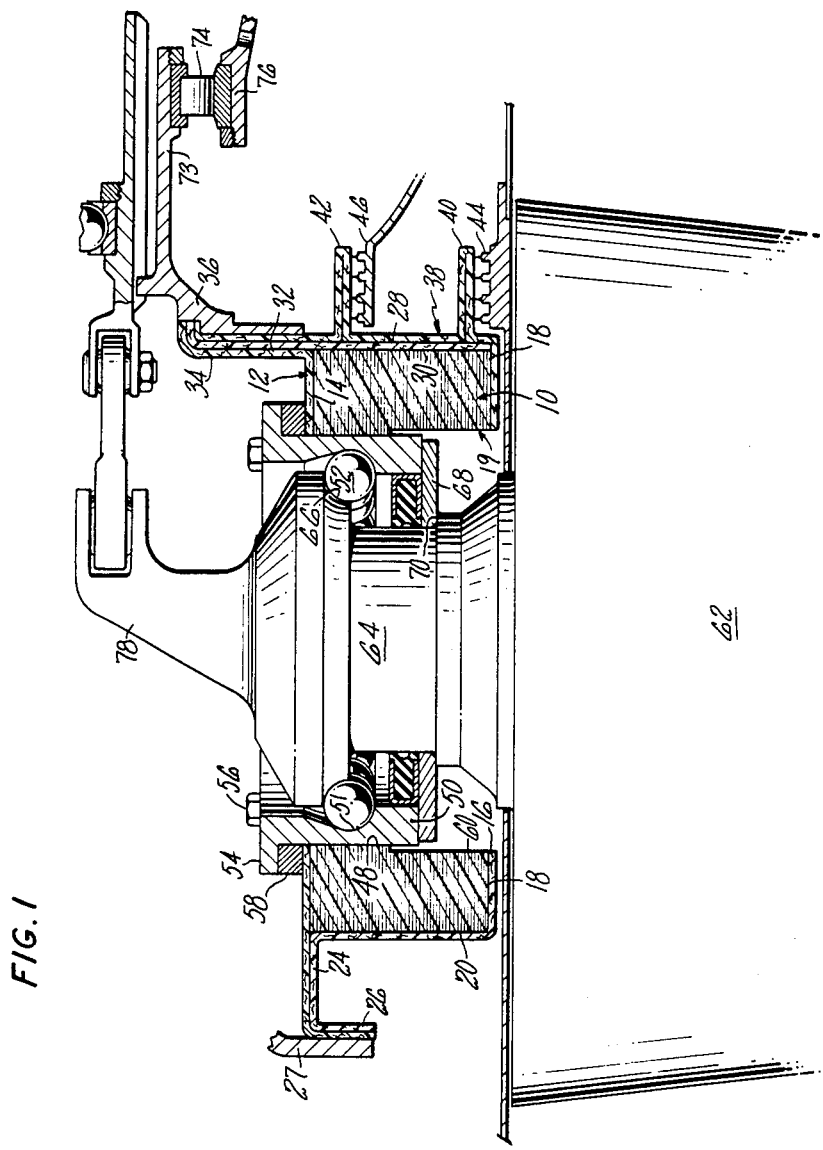
FIG. 1 is a sectional view of a completed ring assembly showing the blade root positioned therein and the mounting of the ring within the engine.

As shown in FIG. 1, the ring 10, made of composite material, as will be described later, has the additional plies of fibers 12 on the inner surface 14 and other plies of fibers 16 on the portion of the outer surface 18 to the left of the groove 19 and on the end surface 20. The fibers 16 overlap with the plies of fibers 12 to form a flange 24 having an outwardly turned edge to form a radial flange 26 for attachment to a driving ring 27.

At the other end of the ring there are additional plies 28 extending generally radially on the outer end surface of the basic ring and projecting radially inward of the ring to overlap with the mating portions 32 of the plies 12 to form the flange 34 for attachment to a support structure 36. Additional plies of fibers 38 on that portion of the outer surface 18 to the right of the groove 19 and extending radially inward therefrom abut against the radial plies 30. At their inner portion these plies form a part of the flange 34. From this set of plies of fibers 38 annular flanges 40 and 42 are formed to serve as sealing flanges cooperating with fixed seals 44 and 46.

The ring 10 has radial holes or openings 48 formed therein to receive mounting bosses 50 each of which has a groove 51 in its inner surface to receive a row of ball bearings. Each boss has a flange 54 at its inner end and this flange is generally square to provide corners to receive bolts 56 therethrough which extend into the composite ring and hold the bosses in position thereon. Suitable spacers 58 are provided to fill the space between the flat flange and the cooperating curved inner surface of the ring to distribute the load on the boss over an extended portion of the ring. The ring also has the annular groove 19, above referred to, in its outer surface 18. This groove intersects the holes 48 and exposes the outer ends of the bosses 50. The surface 18 is in fact two spaced apart distinct surfaces on opposite sides of the annular groove as mentioned earlier.

The fan blade 62 has a root 64 with an annular groove 66 thereon positioned in the supporting boss with the bearings 52 engaging said groove 66 as shown. The balls are trapped in position by a split clamping ring 68 engaging the outer end of the boss and shoulder 70 on the fan blade root 64 and this arrangement serves to hold the blade root securely in position. The ring assembly as above described is supported for rotation in surrounding relation to the engine structure by a supporting structure 73 extending generally inwardly from the attachment flange 34 and attached thereto. The end of the ring 73 opposite the flange 34 is mounted in a bearing 74 carried by a fixed support structure 76 integral with the surrounding engine casing.

The blade root has an eccentrically projecting arm 78 at its inner end to provide for the attachment of a pitch control mechanism. This structure is described and claimed in a copending application Ser. No. 018,117 filed Feb. 24, 1987.

In making the ring 10 the composite structure is built up of layers of plies of high strength fiber generally wrapped around a support drum. Substantially the inner half 10a of the composite ring is made up of about 40% of plies of fibers of graphite filaments arranged at 0° alternating with about 30% of 45° of fiberglass fibers arranged in plies and 30% of 90° fiberglass fibers also arranged in plies. The 0° means parallel to the circumferential direction and obviously 90° means the plies are parallel to the longitudinal axis of the ring. Similarly 45° fibers means at an angle midway between 0° and 90°.

When this portion of the ring is completed the remaining outer half 10b of the ring is built up of wrapped layers of plies of graphite fibers all generally at 0° for circumferential strength and stiffness in the completed ring.

This particular percentage of fibers is characteristic of one specific ring and variations may be utilized depending on the strength desired in certain different portions of the ring. However this particular arrangement has been found to be effective for one particular installation.

After the plies of the ring have all been assembled the complete assemblage is cured by the usual curing procedures utilizing heat and pressure. The plies may have been pre-pregnated with a matrix material or the matrix material may be added at the start of the curing process. Either of these procedures is well known in the art and the techniques for completing the curing process in either event is also well known.

The curing of this basic ring having been completed the several radial openings 48 are machined and the annular groove 19 is also machined to provide the partially completed structure of FIG. 5. It will be noted that the base of the groove 60 is close to the division between the outer 0° plies and the inner composite of different plies.

After the ring has been machined the surrounding plies 12 on the inner surface and the plies 16 on the outer surface are positioned. The surface 18 is now two spaced surfaces 18 by reason of the intervening groove 19 and the plies do not extend over this groove. These plies are generally fiberglass and at 45° so that they may be shaped to conform to the outer wall and the end wall of the ring and also to form the flange 26. Also the plies 20, 28 and 32 are mounted at the other end walls of the ring and these plies are also generally fiberglass and with a 45° arrangement of the fibers. The other plies 38 are also added and shaped as above described to form the necessary flanges as shown in FIG. 1. After these plies have all been added and in the shape shown in the finished product the ring is again subjected to a curing to harden these additional plies and to form a completed ring or disk construction in which these added plies will be integral with and therefore essentially a part of the basic ring. It is understood that the manner and sequence of assembling the plies may be altered to satisfy individual manufacturing and production capabilities.

Thereafter the bosses are mounted with the spacers 58 and the assemblage is then ready for the attachment of the fan blades. Since the assembly of these fan blades is not an essential part of the present invention it will not be described.

It should be understood that the invention is not limited to the particular embodiments shown and described herein, but that various changes and modifications may be made without departing from the spirit and scope of this novel concept as defined by the following claims.

I claim:

1. A ring for the support of a row of fan blades for a bypass turbine engine, the blades being turnable on a radial axis for pitch changing, said ring being a composite in which:

substantially the outer half of the ring has the plies of the fibers generally arranged at 0° to the circumferential direction of the ring, substantially the inner half of the ring having about 40% of the plies arranged at 0° and alternating with an additional 30% of plies at 45° and the remaining 30% at 90 degrees, with additional plies of fibers arranged generally on the side surfaces of the main ring and on the inner and outer surfaces and extending beyond the ring to form mounting flanges for the ring and other flanges thereon, said plies being generally at substantially 45°, said composite ring after being cured having radial holes formed therein for the fan blades, and mounting bosses positioned in said holes to receive the blade roots.

2. A ring as in claim 1 in which the fibers in the outer half are generally of graphite and a substantial part of the fibers in the inner half of the ring are fiberglass.

3. A ring as in claim 2 in which the additional plies are generally fiberglass.

4. A ring as in claim 1 in which the additional plies are added after the main ring is cured and machined to receive the mounting bosses.

5. A ring as in claim 1 in which the mounting bosses are flanged and with the flange at the inner side of the ring and with bolts securing the bosses to the ring.

6. A ring as in claim 1 in which the additional plies are shaped to form extension flanges on the ring.

7. A ring as in claim 1 in which the radial holes in the ring extend through about the inner half of the ring and intersect with an annular groove extending radially inward from the outer surface of the ring to intersect said radial holes.

8. A ring structure for the support of a row of fan blades in a high bypass turbine engine, said structure being of composite material and having circumferentially spaced radial holes therein, said ring having mounting bosses for the blade hubs positioned in said holes and having flanges on their inner ends, both extending through said flanges and into the composite ring to hold the boss in place, composite flanges on said ring and extending outwardly therefrom to provide mounting attachments for the ring structure, said ring having a circumferential recess therein extending in from the outer surface of the ring and intersecting the radial openings, said ring being made up of cylindrical layers of plies of fibers with about the outer half of the ring having 0° fibers circumferentially of the ring and the inner half having a substantial portion of the fibers or the plies at about 45° and the remaining portions being in part 0° and in part 90°, and the flanges extending from the ring comprising other 45° plies on the outer surfaces of the ring and projecting therefrom to form said flanges and forming an integral part of the ring.

9. A ring structure as in claim 8 in which the plies in the outer half are generally graphite material and a substantial part of the fibers in the inner half are fiberglass.

10. A ring structure as in claim 8 in which the additional plies are generally fiberglass.

11. A ring structure as in claim 8 in which the additional plies are added after the main ring is cured and machined to receive the mounting bosses.

12. A ring structure as in claim 8 in which the mounting bosses are flanged and with the flange located on the inside of the ring and with bolts extending through said flanges and into the ring to hold said bosses in place.

13. A ring structure as in claim 8 in which the additional plies are shaped to form extensions on the ring to provide flanges for use in conjunction with the supporting structure.

14. A ring stucture as in claim 8 in which the radial bosses in the ring extend through the inner half of the ring and intersect with the circumferential recess extending inwardly from the outer surface of the ring.

* * * * *